United States Patent [19]

Kawamura et al.

[11] Patent Number: 4,703,888

[45] Date of Patent: Nov. 3, 1987

[54] CLEANING APPARATUS FOR FUEL BURNER

[75] Inventors: Hideo Kawamura, Kanagawa; Yukio Yoshida; Keiichi Yamashita, both of Yokohama, all of Japan

[73] Assignee: Isuzu Motors Limited, Tokyo, Japan

[21] Appl. No.: 870,876

[22] Filed: Jun. 5, 1986

[30] Foreign Application Priority Data

Jun. 11, 1985 [JP] Japan ................................ 60-126877

[51] Int. Cl.⁴ .......................... G05D 23/00; F23N 5/24
[52] U.S. Cl. .............................. 237/2 A; 237/12.3 C; 126/110 C; 431/258; 431/32

[58] Field of Search ............. 237/2 A, 12.3 R, 12.3 C, 237/12.3 A; 431/121, 132, 207, 208, 258, 260, 28, 29, 32

[56] References Cited

FOREIGN PATENT DOCUMENTS 59-199362 11/1984 Japan .

*Primary Examiner*—Henry A. Bennett
*Attorney, Agent, or Firm*—Staas & Halsey

[57] ABSTRACT

A cleaning apparatus for a burner on a motor vehicle energizes a heater of a fuel atomizer for heating and atomizing fuel, when fuel supply to the fuel atomizer is shut off and the speed of rotation of the engine on the motor vehicle is higher than a prescribed level, so that carbon deposits on and in the fuel atomizer will be burned out and removed.

10 Claims, 4 Drawing Figures

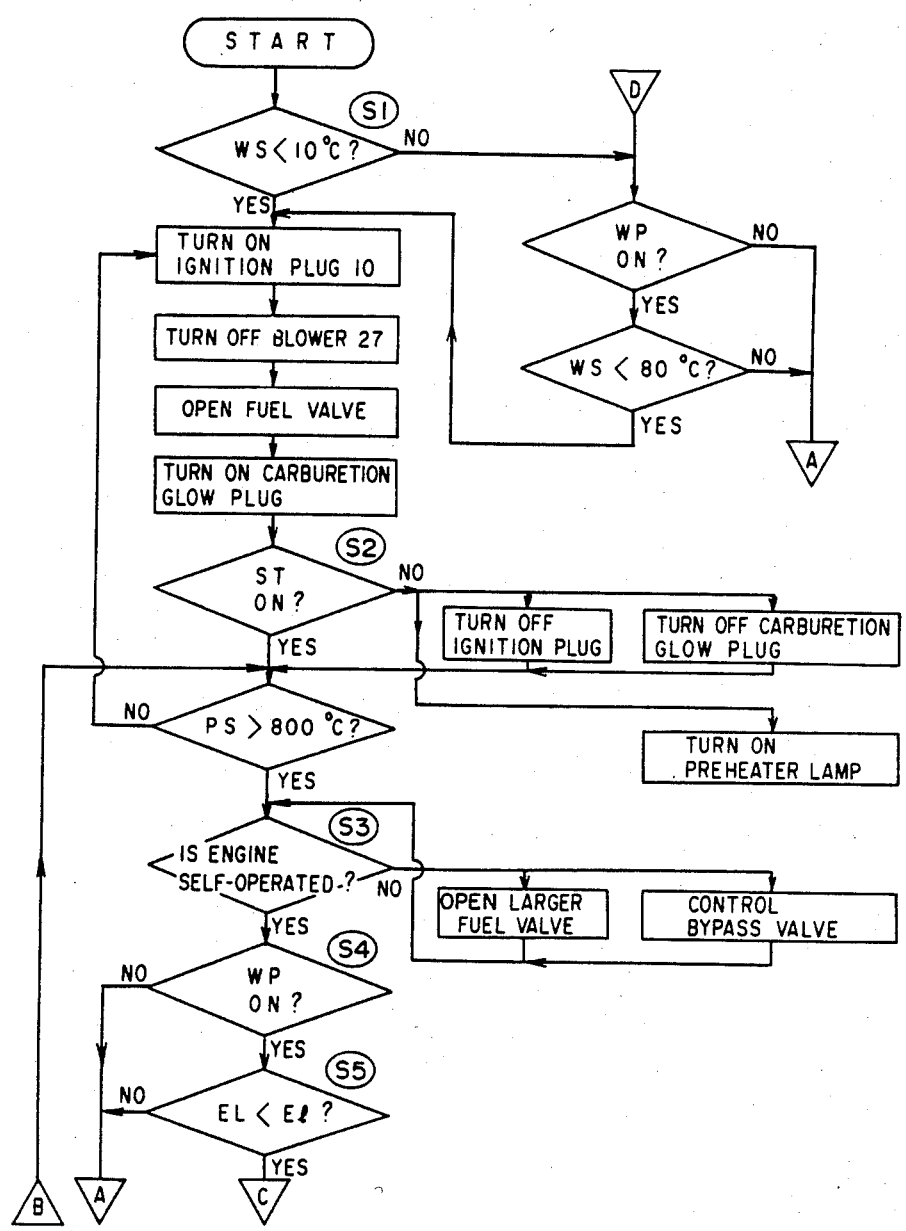
Fig. 3 - (A)

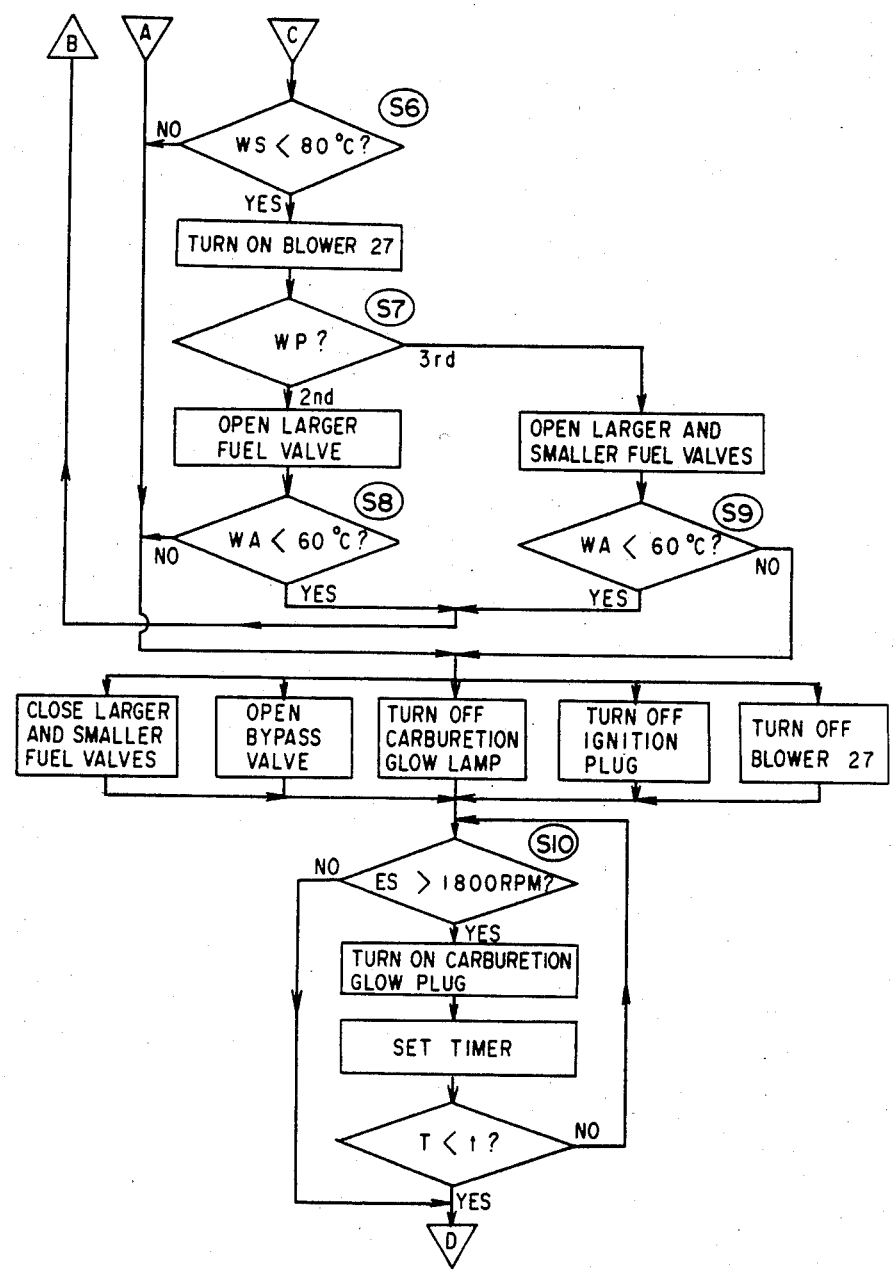
Fig. 3-(B)

CLEANING APPARATUS FOR FUEL BURNER

BACKGROUND OF THE INVENTION

The present invention relates to a cleaning apparatus for a fuel burner for use in a heater mounted on a motor vehicle to heat up the passenger compartment of the motor vehicle.

There have generally been used wick-type burners. The wick-type burners however are large in size and hence are not satisfactory for use on motor vehicles in which installation spaces are limited.

The applicant has proposed a burner having a fuel atomizer for atomizing fuel by heating the same with a heater and an ignition means for igniting the atomized fuel which is injected from the fuel atomizer into a burner body, as disclosed in Japanese Laid-Open Patent Publication No. 59-199362.

However, the proposed burner is disadvantageous in that due to cabonization of unburned fuel, carbon tends to be deposited on the outer and inner peripheries of the burner, especially in a fuel passage thereof, thus narrowing and sometimes clogging the fuel passage to lower the efficiency of the burner.

SUMMARY OF THE INVENTION

It is an object of the present invention to provide a cleaning apparatus for a burner, which will prevent a fuel passage of the burner from being clogged by carbon deposits, by energizing a heater of a fuel atomizer of the burner when fuel supply is shut off, to increase the temperature of the outer periphery of the fuel atomizer for burning out carbon deposits on the outer and inner peripheries of the fuel atomizer to remove carbonized deposits from the fuel atomizer.

According to the present invention, there is provided a cleaning apparatus for a burner on a motor vehicle, the burner including a fuel atomizer having a heater for heating and atomizing supplied fuel, and an igniting means for igniting the atomized fuel injected by the fuel atomizer, the cleaning apparatus comprising speed detecting means for detecting the speed of rotation of the engine mounted on the motor vehicle, fuel detecting means for detecting whether fuel is supplied to the fuel atomizer or not, and a controller for controlling energization of the heater of the fuel atomizer based on a signal from the fuel detecting means, indicating that the fuel is shut off, and a signal from the speed detecting means, indicating that the speed of rotation of the engine is higher than a preset level.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 3(A) and 3(B) are a flowchart for an operation sequence of the cleaning apparatus.

DESCRIPTION OF THE PREFERRED EMBODIMENTS

Figure 1:
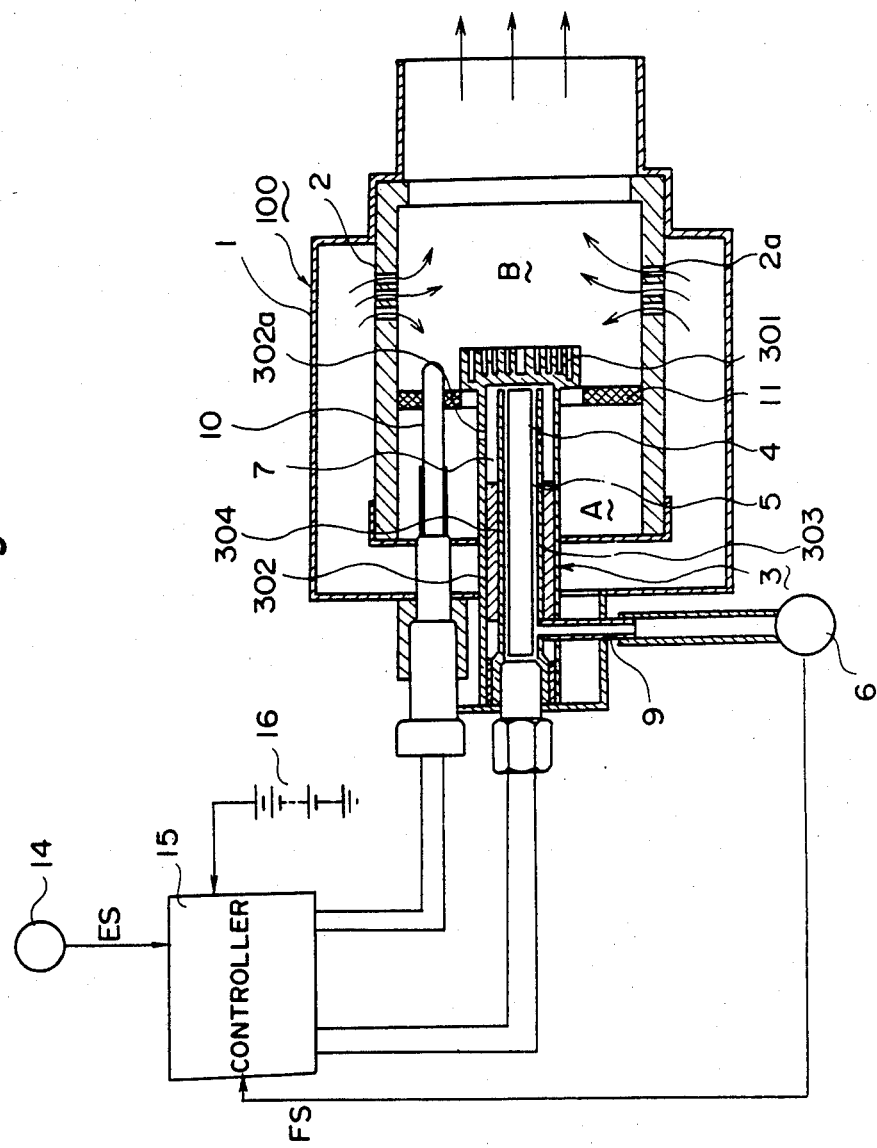
FIG. 1 is a cross-sectional view of a cleaning apparatus for a burner according to the present invention.

As illustrated in FIG. 1, a burner 100 has a cylindrical casing 1, a cylindrical burner housing 2 disposed concentrically in the casing 1, an atomization accelerator plate 11 disposed in the burner housing 2 and dividing the interior space thereof into an atomizing chamber A and a combustion chamber B, a fuel atomizer 3 projecting from one end of the casing 1 into the burner housing 2, and an ignition plug 10 for igniting atomized fuel injected from the fuel atomizer 3 into the burner housing 2.

The burner housing 2 is made of a heat-resistant material such as ceramics or a heat-resistant alloy, and has a plurality of air inlet holes 2a defined in its cylindrical wall.

The atomization accelerator 11 is of a honeycomb structure of a heat-resistant material such as ceramics, and serves to accelerate fuel atomization when the atomized fuel injected into the atomizing chamber A, is introduced into the combustion chamber B.

The fuel atomizer 3 has heat-receiving fins 301 on its distal end. The fuel atomizer 3 comprises an outer tube 302 having small injection holes 302a defined in its circumferential wall, an inner tube 303 disposed concentrically in the outer tube 302, a glow plug 4 disposed as a fuel atomizing heater in the inner tube 303, and a pipe 304 interposed between the outer tube 302 and the inner tube 303 closely to their rear ends. The heater 4 is made of ceramics and has an elliptical cross-sectional shape. The heater 4 has one end held against the inner surface of the inner tube 303 for transferring heat to the inner tube 303. The fuel atomizer 3 has a passage 7 defined between the outer tube 302 and the inner tube 303 and a passage 5 defined between the inner tube 303 and the heater 4, the passages 7, 5 communicating with each other at their distal ends. The passage 5 is supplied with fuel through a fuel supply pipe 9 from a fuel supply controlling device 6 having fuel supply valves which supply fuel at different rates.

Fuel supplied via the fuel supply pipe 9 from the fuel supply controlling device 6 into the passage 5 of the fuel atomizer 3 is heated by the heater 4 into an atomized state. While the atomized fuel is being passed through the passage 7, it is heated and sufficiently atomized by the heat from the inner tube 303 and the heat which is received by the outer tube 302 through the fins 301 and the combustion chamber B. The atomized fuel is then injected through the injection holes 302a into the atomizing chamber A. The atomized fuel injected into the atomizing chamber A is brought into contact with the ignition plug 10 which is red-heated by being energized by a battery 16 through a controller 15. The atomized fuel is partly ignited by the ignition plug 10, and enters the combustion chamber B through the atomization accelerator 11. The atomized fuel that has entered the combution chamber B is mixed with air introduced through the air inlet holes 2a, and is effectively combusted into a high-temperature combusted gas, while producing flames. The combusted gas, together with fresh air introduced via the air inlet holes 2a, flows into a downstream heat exchanger or an intake port of an internal combustion engine. The burner casing 1 is supplied with air from an air inlet of the internal combustion engine, such as an air cleaner or an external air inlet port (not shown).

Designated at 14 is a speed sensor for detecting the speed of rotation of the internal combustion engine and applying a signal ES indicative of the detected speed to the controller 15.

Figure 2:
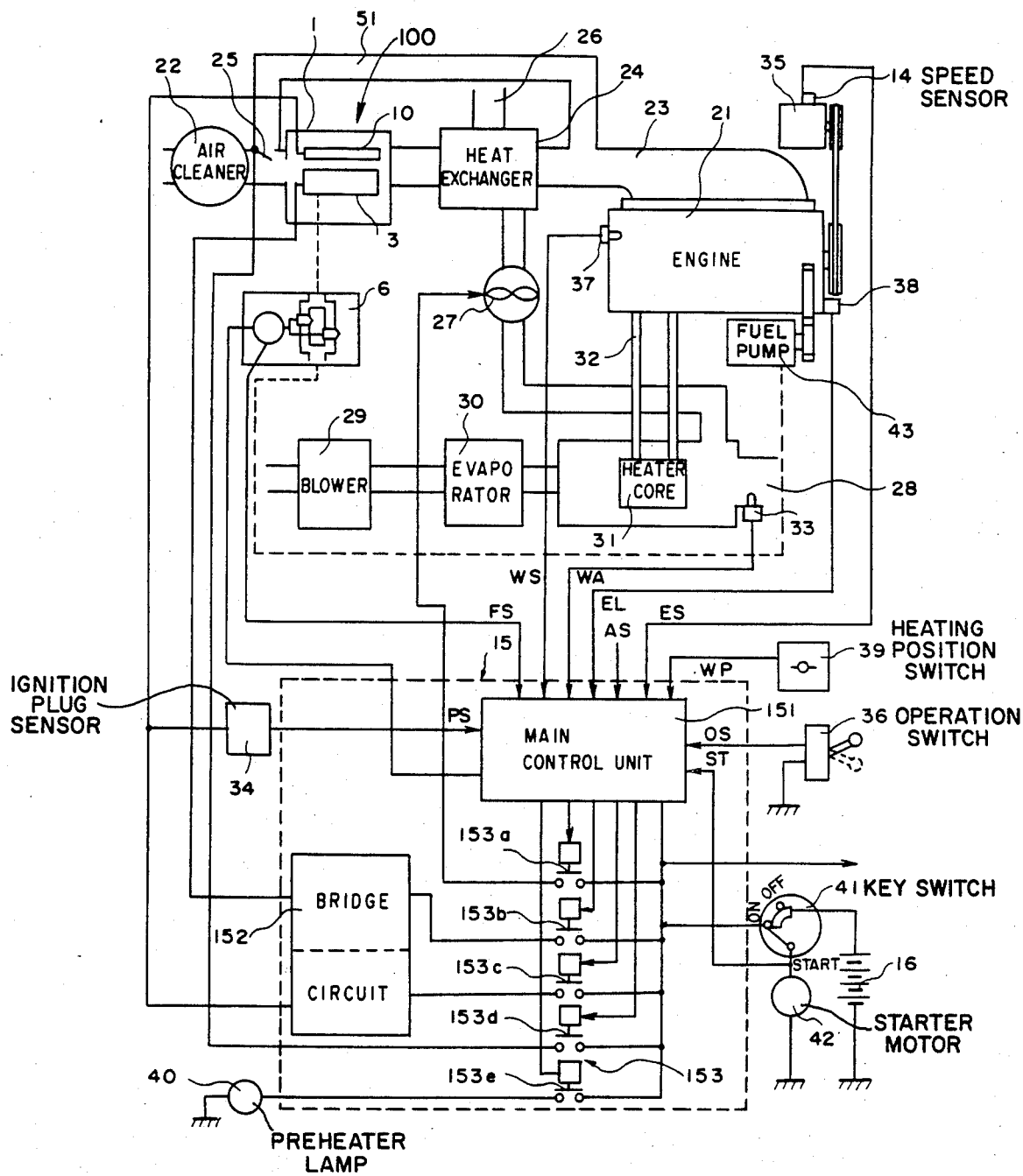
FIG. 2 is a block diagram of a motor vehicle heater employing the cleaning apparatus of the present invention.

As shown in FIG. 2, the burner 100 is disposed in an air duct leading from an air cleaner 22 for an engine 21 to an intake pipe 23, and a heat exchanger 24 is disposed downstream of the burner 100. A bypass passage 51 supplies combustion air to the engine 21 and has a bypass valve 25 for controlling the rate of air flow into the burner 100.

Air is introduced through an air inlet 26 into the heat exchanger 24 in which the air receives the heat of the combusted gas supplied from the burner 100. The air from the heat exchanger 24 is delivered by an air blower 27 through an outlet 28 into the passenger compartment of the motor vehicle to heat up same. A heater utilizing the engine coolant is composed of an air blower 29, an evaporator 30, a coolant heater core 31, and a coolant passage 32. A temperature sensor 33 is disposed in the outlet 28.

An ignition plug sensor 34 detects the temperature of the ignition plug 10, i.e., the temperature of the combustion chamber B, by detecting the electric resistance of the ignition plug 10, and applies a detected temperature signal PS to the controller 15.

The controller 15 is in the form of a microcomputer comprising a main control unit 151 supplied with a speed signal ES from the speed sensor 14 mounted on a generator 35 driven by the engine 21, an ON/OFF signal OS from an operation switch 36, a coolant temperature signal WS from a coolant temperature switch 37 which detects the temperature of the coolant, a start position signal ST, an accelerator opening signal AS, a heated-air temperature signal WA from the temperature sensor 33 in the outlet 28, a heating signal WP from a heating position switch 39 operated by the driver, the temperature signal PS from the ignition plug sensor 34, and a fuel signal FS indicative of the rate of fuel supply which is applied from the fuel supply controlling device 6. The controller 15 also includes a bridge circuit 152 for controlling the glow plug 4 and the ignition plug 10 to be heated to prescribed temperatures, and a switch assembly 153. The main control unit 151 has a processor, a memory, and an input/output interface. The switch assembly 153 includes a switch 153a for controlling the blower 27, switches 153b, 153c for supplying electric power to the bridge circuit 152, a switch 153d for controlling the opening of the bypass valve 25, and a switch 153e for supplying electric power to a preheater lamp 40. Denoted at 41 is a key switch, 42 a starter motor, and 43 a fuel pump.

While the burner 100 is in operation, the fuel passing through the passages 5, 7 of the fuel atomizer 3, is atomized by the heat from the heater 4 and combusted in the combustion chamber B. Part of the fuel is carbonized by the heat, and the carbon tends to be deposited in the passages 5, 7 and outer an inner peripheries of the fuel atomizer 3 where air is not sufficiently supplied.

According to the present invention, the carbon deposits thus formed are burned out and removed when the burner is not being used in the following manner:

The controller 15 checks the signal FS from the fuel supply controlling device 6 and the signal ES from the speed sensor 14. When the signal FS indicates that fuel supply to the fuel atomizer 3 is shut off and the signal ES indicates that the engine rotates at a prescribed high speed, the controller 15 energizes the heater 4 with the battery 16.

The heater 4 is red-heated to heat the carbon deposits on the passages 5, 7 which are made of a good heat conductor. Since there is no fuel supplied, no heat is lost for fuel atomization, and the passages 5, 7 are well heated to burn out the carbon deposits in the passages 5, 7 and on the outer and inner peripheries of the fuel atomizer 3. Therefore, the fuel passages 5, 7 are free of clogs and allow fuel to pass smoothly therethrough.

As one condition, the engine 21 should be operated at a preset high speed during removal of the carbon deposits since the battery 16 is charged and not consumed even when the heater 4 is energized thereby. While the engine 21 is rotating at a high speed, the burner 100 is not used for preheating intake air for the engine 21 and for heating the passenger compartment since it can be heated up by the engine coolant. The condition in which the burner 100 is not operated is confirmed as another condition by the signal FS from the fuel supply controlling device 6.

FIGS. 3(A) and 3(B) are a flowchart of an operation sequence of the cleaning apparatus of the present invention.

When the key switch 41 is turned on to energize the controller 15 and other accessory circuits, the controller 15 ascertains whether the temperature of the engine coolant has reached a certain temperature such as 10° C., for example, based on the coolant temperature signal WS from the coolant temperature switch 37, in a step S1. If the coolant temperature WS is below 10° C., then the burner 100 is to be used for assisting the engine 21 in getting started. Therefore, the controller 15 turns on the switch 153c to energize the ignition plug 10, turns off the switch 153a to stop the blower 27, controls the fuel supply controlling device 6 to supply fuel from the fuel pump 43 to the fuel atomizer 3, and turns on the switch 153b to energize the glow plug 4. The controller 15 then checks the signal ST from the key switch 41 in a step S2. If the start position is ON, then the controller 15 checks the combustion condition in the burner 100 based on the signal PS from the ignition plug sensor 34. If the combustion temperature represented by the signal PS is higher than 800° C., it is confirmed that the fuel is sufficiently combusted, and hot air is supplied to the engine 21 to assist it in getting started.

Then, the controller 15 ascertains whether the engine 21 is self-operated based on the signal ES from the speed sensor 14 in a step S3. If not self-operated, the controller 15 controls the fuel supply controlling device 6 and the bypass valve 25 to increase the fuel supply and feed an increased amount of hot air to the engine 21 for enabling the engine 21 to be started.

If the engine is self-operated, if the heating position switch 39 is turned if, a signal EL from a load sensor 38 is smaller than a prescribed load E1, and the signal WS from the coolant temperature sensor 37 is below 80° C. (steps S4 through S6), then the controller 15 turns on the switch 153a to operate the blower 27 for discharging heated air from the heat exchanger 24 through the outlet 28 into the passenger compartment to heat same.

If the heating position switch 39 is in a 2nd position in a step S7, then the controller 15 controls the fuel supply controlling device 6 to operate the larger fuel supply valve for increasing the fuel supply to increase the amount of fuel combustion. If the heating position switch 39 is in a 3rd position in the step S7, then the controller 15 opens the larger and smaller fuel supply valves to maximize the fuel supply for the maximum amount of fuel combustion. The controller 15 checks the signal WA from the heated-air temperature sensor 33 in a step S8 or S9. If the temperature of the heated air is higher than 60° C., the controller 15 closes the larger and smaller fuel supply valves, controls the bypass valve 25 to shut off air flow into the burner 100, and turns off the glow plug 4, the ignition plug 10, and the blower 27.

The cleaning apparatus operates as follows: The controller 15 checks the signal ES from the speed sensor 14 in a step S10. If the engine speed is higher than 1,800 rpm, then it is confirmed that the generator 35 is producing a sufficient amount of electric power, and the controller 15 energizes the glow plug 4 to clean the burner 100. A timer in the controller 15 is now set. If the time t that has elapsed after the glow plug 4 has been energized is shorter than a prescribed time T required for cleaning, then the program returns to the step S10 for checking the engine speed with the signal ES. If the engine speed is higher than 1,800 RPM in the step S10, then the glow plug 4 is energized to clean the burner 100, and the cleaning process is completed. The engine speed is rechecked because if the engine speed were lowered, the output from the generator 35 would also be reduced, placing a larger load on the battery 16.

According to the cleaning apparatus of the invention, as described above, when the fuel supply valves are closed and the engine speed is high, the heater is energized to increase the temperature of its outer periphery for burning out carbon deposits on the outer and inner peripheries of the fuel atomizer and in the fuel passages thereof, so that the fuel passages are prevented from being clogged and lowering the efficiency of the burner.

Although a certain preferred embodiment has been shown and described, it should be understood that many changes and modifications may be made therein without departing from the scope of the appended claims.

What we claim is:

1. A cleaning apparatus for a burner on a motor vehicle having an engine mounted thereon, the burner including a fuel atomizer having a heater for heating and atomizing supplied fuel, and an igniting means for igniting the atomized fuel injected by the fuel atomizer, said cleaning apparatus comprising:
   speed detecting means for detecting the speed of rotation of the engine mounted on the motor vehicle and for providing a speed signal;
   fuel detecting means for detecting whether fuel is supplied to the fuel atomizer or not and for providing a fuel signal; and
   A controller, coupled to said speed detecting means and said fuel detecting means, for controlling energization of the heater of the fuel atomizer when the fuel signal from said fuel detecting means indicates that the supply of fuel is shut off, and the speed signal from said speed detecting means indicates that the speed of rotation of the engine is higher than a preset level.

2. A cleaning apparatus according to claim 1, wherein said controller includes a timer for setting a time period for which the heater is to be energized.

3. A cleaning apparatus according to claim 1, wherein:
   the fuel atomizer comprises a tubular body;
   the heater is disposed in the tubular body; and
   the tubular body and the heater define a passage therebetween which is supplied with the fuel.

4. A cleaning apparatus according to claim 1, wherein:
   the fuel atomizer comprises an outer tube and an inner tube disposed concentrically in the outer tube;
   the heater is disposed in the inner tube;
   the outer and inner tubes define a first passage therebeween;
   the inner tube and the heater define a second passage therebeween and held in communication with the first passage; and
   the second passage is supplied with the fuel.

5. A cleaning apparatus according to claim 4, wherein the outer tube has heat-receiving fins on one end thereof.

6. A motor vehicle heater mounted in a motor vehicle having an engine, to heat the passenger compartment of the motor vehicle, comprising:
   means for supplying fuel;
   a burner for igniting the supplied fuel, said burner having deposits formed thereon, said burner including:
   a fuel atomizer having means for heating the supplied fuel, said fuel atomizer atomizing the supplied fuel; and
   igniting means for igniting the atomized fuel produced by the fuel atomizer;
   means for transferring heat from the ignited atomized fuel to the passenger compartment of the motor vehicle;
   speed detecting means for detecting the speed of rotation of the engine and for generating a speed signal;
   fuel detecting means for detecting whether fuel is being supplied to said fuel atomizer and for generating a fuel signal; and
   control means for controlling the energization of said heating means in said fuel atomizer when the fuel signal from said fuel detecting means indicates that fuel is not being supplied to said fuel atomizer and the speed signal from said speed detecting means indicates that the speed of rotation of the engine is higher than a predetermined speed, so that when said heating means is energized by said control means, the deposits on said burner are burned off.

7. A motor vehicle heater according to claim 6, wherein said control means includes a timer for setting a time period during which said heating means is to be energized.

8. A motor vehicle heater according to claim 6, wherein:
   said fuel atomizer comprises a tubular body;
   said heating means of said fuel atomizer is disposed in said tubular body; and
   said tubular body and said heating means define a passage therebetween is supplied with the fuel.

9. A motor vehicle heater according to claim 6, wherein:
   said fuel atomizer comprises an outer tube and an inner tube disposed concentrically in said outer tube;
   said heating means of said fuel atomizer is disposed in said inner tube;
   said outer and inner tubes define a first passage therebetween;
   said inner tube and said heating means define a second passage therebetween, with the second passage being held in communication with the first passage; and p1 the second passage is supplied with the fuel.

10. A motor vehicle heater according to claim 9, wherein said outer tube has heat receiving fins on one end thereof.

* * * * *

UNITED STATES PATENT AND TRADEMARK OFFICE
CERTIFICATE OF CORRECTION

PATENT NO. : 4,703,888

DATED : NOVEMBER 3, 1987

INVENTOR(S) : HIDEO KAWAMURA ET AL.

It is certified that error appears in the above-identified patent and that said Letters Patent is hereby corrected as shown below:

Col. 2, line 49, "and" should be --in--.

Col. 4, line 55, "if, a" should be --on, if a--;
         line 56, after "and" insert --if--.

Col. 6, line 63, after "passage" insert --and--;
         line 64, delete "and pl".

Signed and Sealed this

Twenty-sixth Day of April, 1988

Attest:

DONALD J. QUIGG

*Attesting Officer*　　　　*Commissioner of Patents and Trademarks*